Sept. 5, 1967  W. P. FOSTER  3,339,933
ROTARY SEAL
Filed Feb. 24, 1965  2 Sheets-Sheet 1
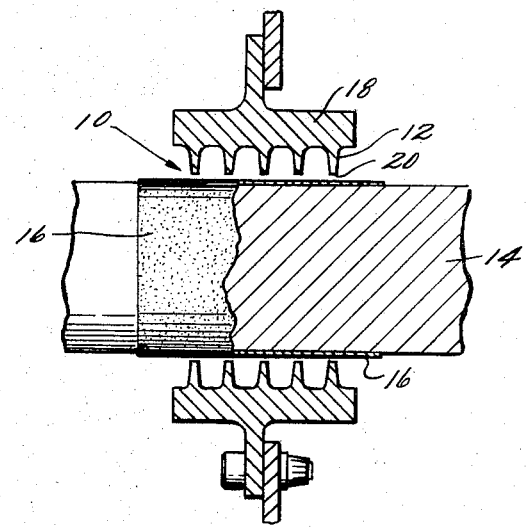
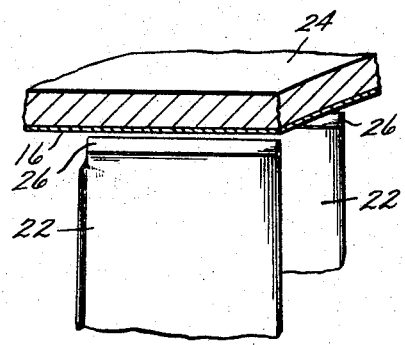
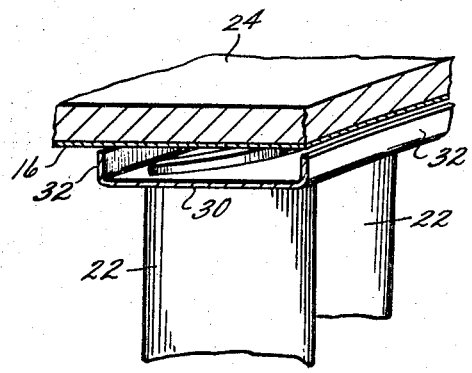
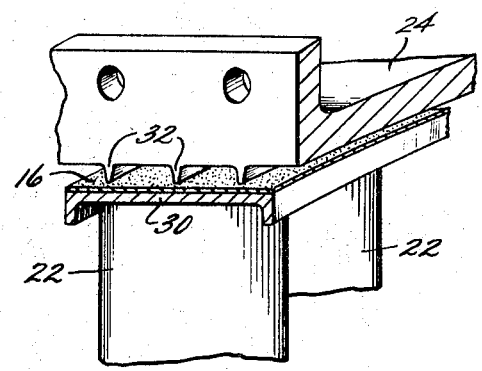
INVENTOR.
WILLIAM P. FOSTER
BY
ATTORNEY

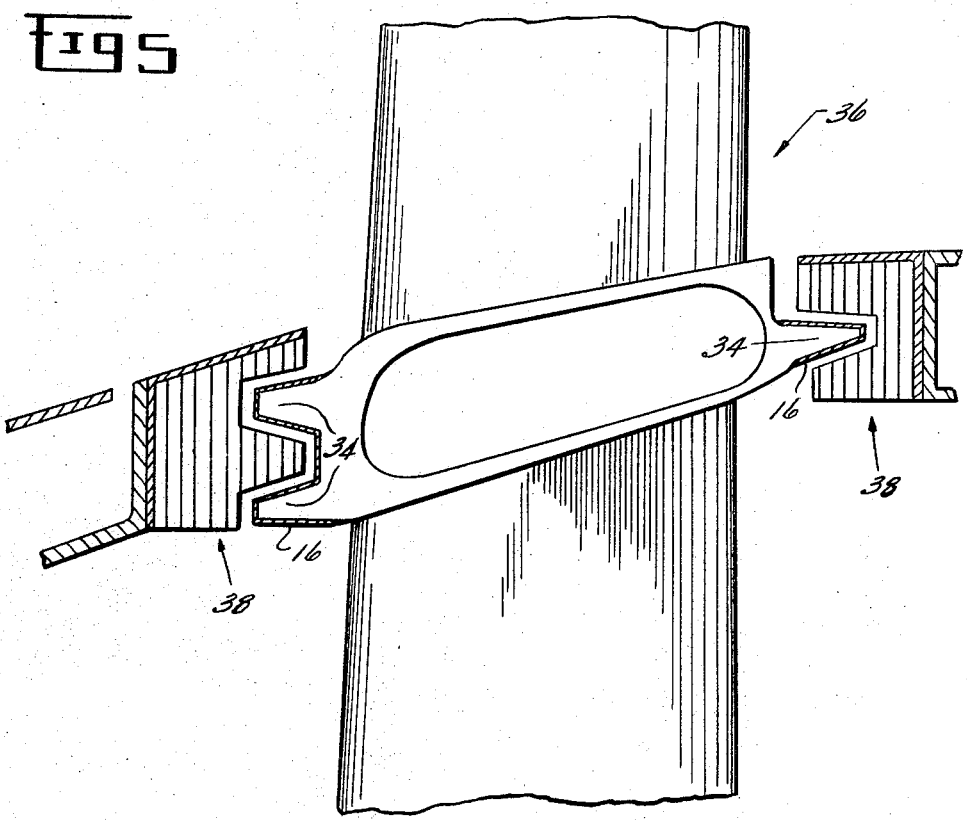

United States Patent Office 3,339,933
Patented Sept. 5, 1967

3,339,933
ROTARY SEAL
William Phillips Foster, Andover, Mass., assignor to General Electric Company, a corporation of New York
Filed Feb. 24, 1965, Ser. No. 434,784
6 Claims. (Cl. 277—53)

ABSTRACT OF THE DISCLOSURE

A seal including a rotating member and a stationary member to inhibit fluid flow between the members. One of the members includes a surface portion comprising a bonded high temperature oxide. The other member projects toward the surface portion. The high temperature oxide material is selected from alumina and zirconia and is not abradable by the cooperating member during operation.

---

This invention relates to rotary seals one member of which rotates in cooperation with another and, more particularly, to such a seal which controls the heat of friction between the members.

Rotary seals such as labyrinth seals or honeycomb seals, which include rotating members in cooperation or in intimate juxtaposition one with the other, are frequently used in various parts of power producing apparatus such as gas turbines. Their use is to prevent fluid, such as air, in a chamber at one pressure from passing to a chamber at a lower pressure. For example, such seals are used between steam or gas turbine stationary structural members and a rotating shaft as well as between the tips or outer covers of rotating blading members and cooperating stationary casings.

A large portion of the trouble experienced with such seals has been caused by excessive heat being generated from friction and wear of one of the members and the subsequent accumulation of such heat in the member which is not intended to be worn when rubbing occurs. For example, in a labyrinth seal if the projections or teeth of one member cooperates with and actually rubs a continuous surface of a rotating shaft as the other member during operation of a gas turbine, the teeth in contact with the shaft will at least be distorted or "mushroomed" and generally their tips will be worn away. The heat generated due to friction has been seen to cause damage to the rotating shaft, the member which is not worn. Such friction heat has resulted in bowing and cracking of turbine shafts, cutting and cracking of turbine bucket shrouds or covers and various other similar failures.

Therefore it is a principal object of the present invention to provide an improved rotary sealing arrangement which controls the heat of friction between the seal members.

A more specific object is to provide the member which is subject to friction heat damage in a rotary seal arrangement with a surface which is capable of abrading a cooperating member, the surface at the same time acting as a thermal insulator.

These and other objects and advantages will be more readily recognized from the following detailed description, examples and drawing which are exemplary of rather than any limitation on the scope of the present invention.

In the drawing:

FIG. 1 is a fragmentary, partially sectional view of a labyrinth type rotary seal of the present invention including stationary teeth and a rotating shaft;

FIG. 2 is a fragmentary, partially sectional view of a rotating blading member in sealing relationship with a coated continuous stationary casing;

FIG. 3 is a fragmentary, partially sectional view of shrouded rotating blading members in intimate juxtaposition with a coated continuous stationary casing;

FIG. 4 is a fragmentary, partially sectional view of shrouded rotating blading members, the shroud of which is coated and forms one member of a seal in cooperation with a stationary casing member; and FIG. 5 is a fragmentary partially sectional view of a rotating blading member having intermediate coated teeth as one member of a labyrinth seal.

Briefly, the present invention broadly comprises a rotary seal having a stationary member and a rotating member. The members cooperate one with the other in a fluid pressure drop seal relationship. One of the members has a surface portion, which can be raised or inset, of a bonded high temperature oxide material, such as bonded alumina, which has thermal insulation characteristics and is of a hardness during operation greater than the material of the other member so as to be capable of abrading the other member. Thus the surface portion protects that portion of the member from distortion or other damage due to heat of friction as a result of any abrasion between the two members at that surface portion.

A large number of rotary seal arrangements have been proposed in the literature whereby rotating members have generated, abraded or cut a path in a softer cooperating member such as of filled honeycomb, porous metal, friable ceramic or the like. Other arrangements provide for one of the members to be abraded by a rough but thermally conductive surface of the other member, for example, a roughened casing cooperating with rotating plates or blades. However, it has been found that in some such arrangements inadequate sealing or actual seizing of the members results. In other arrangements thermal distortion or local "hot-spots" and burning of the non-abrading member occurs because the non-abrading member is not thermally insulated from the source of friction heat.

It has been unexpectedly recognized that if an abrading surface of the non-abrading member includes a material which has both thermal insulation qualities as well as abrasion qualities with respect to the other member, a significantly improved rotary sealing means results. A typical arrangement according to the present invention is that shown in FIG. 1 in the form of a labyrinth seal shown generally at 10 including projections or teeth 12 in intimate juxtaposition with rotating shaft 14. Shaft 14 has a surface 16 based on bonded alumina, a preferred high temperature abrasive oxide material. In operation of this kind of seal in a gas turbine apparatus, both the stationary member 18 and the rotating member 14 of the rotary seal 10 will tend to expand as a result of heat generated by the gas turbine. Teeth 12 which are a metal, for example, such as leaded nickel-bronze, an aluminum alloy, a 12% chromium steel alloy such as of the A.I.S.I. 400 series, etc., will be worn at their tips 20 as the members contact one another. In the absence of a surface 16 which is capable of abrading tip 20 as well as thermally insulating shaft 14 from the heat of friction, shaft 14 has been known to bow or crack. The introduction even of a thin thermal barrier of the bonded abrasive insulating material at the areas of contact has unexpectedly been found to prevent such damage.

Problems relating to the distortion and cracking of casing members in cooperation with rotating blading members or their shrouds have been eliminated by providing a surface portion of the continuous member with a high temperature abrasive and thermal insulating oxide as shown in the arrangements of FIGS. 2, 3 and 4. In the arrangement of FIG. 2, blading member 22 is designed to rotate in intimate juxtaposition with a portion of a stationary casing 24. In some instances, the blading members are provided with a thin tip 26 which is designed to rub on the surface of the casing 24. The rub can occur in a number of cases, for example where heat during operation causes the blading member to expand at a rate faster than the casing grows radially outward, at shut down, during transient interference such as compressor stall or where rapid cooling of the casing causes it to shrink faster than the blading member. This rubbing has been known to cause local hot spots in casing 24 and to cause the cracking or general distortion of such casing. A significant amount of frictional heat is generated in the casing when a large number of rotating blades, such as are found in the axial flow compressors of advanced aircraft gas turbines, rub at a high rate of speed on casing 24. According to the present invention it has been unexpectedly found that the introduction of a rubbing surface 16 of bonded alumina, in FIG. 2 will readily abrade tip 26 yet will protect casing 24 from heat distortion and cracking.

In some apparatus, the blading members are banded with an outer member or shroud 30 as shown in FIGS. 3 and 4. With this arrangement, in order to prevent interstage leakage of air, steam or other fluid in a compressor or turbine, pressure drop sealing projections 32 are provided either on the shroud as in FIG. 3 or on the casing as in FIG. 4. The introduction of a bonded high temperature abrasive and thermally insulating oxide surface 16 such as based on alumina on the continuous members of the seals such as casing 24 in FIG. 3 or shroud 30 in FIG. 4, has eliminated problems relating to distortion and cracking due to the heat of friction.

*Example 1*

The rotating shaft 14 in the seal of FIG. 1 was provided with a bonded abrasive heat resistant oxide surface 16 by depositing from a plasma arc spray gun a material consisting essentially of 2.5 weight percent titanium dioxide with the balance aluminum oxide. The surface or coating was between 0.005"–0.015" in thickness. After testing the seal in operation, it was found that the bonded oxide surface adhered to the shaft 14 and successfully abraded tips 10 of teeth 12. Furthermore, as a thermal insulator, it prevented the heat of friction from distorting, burning or otherwise damaging rotating shaft 14 even under heavy rubbing conditions.

It was found that the seal of this invention permitted operation at minimum running clearances without danger of "rub-in" damage. It was noted, that the tendency of seal teeth 12 to "mushroom" on rubbing is greatly reduced or eliminated thereby reducing seal leakage up to about 25%.

One recommended procedure used for the application of bonded alumina was first to degrease the surface of the member to which the alumina is to be bonded and then to mask areas not to be coated. It is preferable then to grit blast the surface to be coated with a hard grit such as 120 mesh alumina at 80 p.s.i. Alumina which can be in the form of rod or powder then was bonded by flame spraying to a thickness of between 0.03"–0.15". In one instance, the following settings were used: oxygen 35 std. cu. ft./hr. (s.c.f.h.), acetylene 35 s.c.f.h., air 80 p.s.i., distance to part 4–5", feed rate of rod 5"/min. After coating, the masking was removed. If thicker coating portions are desired, additional applications of alumina can be made. In some instances, it has been found advantageous to polish or grind the surface of the bonded alumina for a smoother rubbing, better sealing arrangement.

*Example 2*

In another test, a cloth to which 80 grit aluminum oxide was bonded was used as the bonded alumina surface. The cloth was cemented to a ring rotating at 30,000 ft./min. to simulate use between stages of an axial flow compressor rotor. The cement used was Minnesota Mining and Manufacturing Company cement EC 826.

The alumina surface was in intimate juxtaposition with stationary blades similar to the arrangement shown in FIG. 2. The blade specimens were of AISI type 410 stainless steel and had the dimensions of 0.250 in. chord x 0.250 in. long x 0.020 in. thick. After testing, it was noted that the vane tips were worn 0.068 in. at a rate of 0.005 in./sec. There was no evidence of a thermal wear process. Instead, wear was by high speed grinding (30,000 ft./min.) as evidenced by the sharp, clean blade tips. Very little heat was generated as judged from the appearance of the abrasive cloth which looked unused in spite of the fact that the temperature limit of the EC 826 cement is reported to be less than about 200° F. The ring beneath the abrasive surface was in excellent condition.

*Example 3*

In another test of the type described in Example 2, the spacer ring was coated with bonded alumina by flame spraying from rod to a thickness of about 0.01 inch. In this example, the blades were smoothly worn 0.087 inch at a rate of 0.05 in./sec. The alumina coating completely protected the rotating ring judging from the fact that there was no heat discoloration. There was very little effect on the coating. In tests using uncoated rings, all blade tips in excess of 0.005 inch in thickness produced burned areas on the torque rings.

*Example 4*

The test of Example 2 was repeated with 120 grit aluminum oxide cloth with the excellent results. The blades were cleanly worn and the cloth was in the same good condition as in Example 2 with no ovidence of over heating.

*Example 5*

The tests of Examples 1 and 3 were repeated except that flame sprayed and bonded tungsten carbide was applied. In Example 3 type operation, the total vane tip wear was 0.074 in. at an interference rate of 0.005 in./sec. Observation showed that the ring was intensely over heated at a hot spot and the vanes were mushroomed by a thermal wear process. In the case of Example 1 type operation, the shaft was intensely over heated at all areas of rub as if no coating had been applied.

Thus it was recognized that all abrasive non-metallics are not equivalent in the practice of the present invention and that such bonded abrasive high temperature oxides principally of alumina or zirconia should be included in the surface. In this way a rotary seal of unusual stability can be provided.

*Example 6*

The transition seal teeth 34 of the blading member 36 of FIG. 5 were coated to protect the teeth which during operation expand in length and width into cooperating honeycomb members 38 to form rotating seals. Surface 16 was applied by flame spraying with a combustion gun to a thickness of 0.003"–0.005" from a powdered material having the following composition, by weight:

|  | Percent |
|---|---|
| Nickel aluminide | 70 |
| Alumina | 30 | marketed by Metco, Inc., as Metco XP 1129.

After spraying, the rotating seal was tested for 150 hours of start and stop conditions without damage or distortion to the teeth 16.

*Example 7*

A rotating member such as 30 in FIG. 4 of an AISI 400 series stainless steel was provided with a surface 16 by plasma arc spray from a material having a composition, by weight of:

|  | Percent |
|---|---|
| Nickel aluminide | 30 |
| Alumina | 70 |

The thickness of the surface was about 0.01". After preparation, the coated member was successfully tested in a rotating seal arrangement as in FIG. 4 in a steam atmosphere at rotational speeds in excess of 20,000 ft./min. After testing, the surface 16 was in good condition and member 30 was unaffected by the heat of friction generated by teeth 32 rubbing and abrading on surface 16.

Although the present invention has been described in connection with specific examples, it will be understood by those skilled in the arts involved the variations and modifications of which this invention is capable.

What is claimed is:
1. A rotary seal comprising:
   a rotating member;
   a stationary member; and
   a surface portion of a bonded high temperature oxide bonded with a first of said members, the high temperature oxide material
   (a) comprising at least 30 weight percent of the surface portion and being an oxide selected from the group consisting of the oxides of aluminum and zirconium,
   (b) having thermal insulation characteristics, and
   (c) being of a hardness during operation greater than the other member so as to be capable of abrading the other member but being non-abradable with respect to the other member;
   the other member including a projection directed toward the surface portion on the first member and cooperating with the surface portion to provide a fluid pressure drop seal between the members.
2. The seal of claim 1 in which the other member is the rotating member in the form of a blading member having a tip portion directed toward the surface portion on the stationary member.
3. The seal of claim 1 in which the high temperature oxide material is alumina.
4. The seal of claim 1 in which the high temperature oxide material is zirconia.
5. The seal of claim 1 in which the high temperature oxide material is 30–70 weight percent alumina with the balance nickel aluminide.
6. The seal of claim 1 in the form of a labyrinth seal in which the other member includes a plurality of projections directed toward the surface portion on the first member to cooperate with the surface portion to provide a labyrinth seal between the members.

References Cited

UNITED STATES PATENTS

| | | |
|---|---|---|
| 953,674 | 3/1910 | Westinghouse. |
| 1,999,739 | 4/1935 | Rasmussen. |
| 2,336,323 | 12/1943 | Warren. |
| 2,491,677 | 12/1949 | McCulloch. |
| 2,491,678 | 12/1949 | McCulloch. |
| 2,519,588 | 8/1950 | McCulloch. |
| 2,963,307 | 12/1960 | Bobo _____ 277—53 |
| 3,053,694 | 9/1962 | Daunt et al. _____ 277—81 X |
| 3,120,919 | 2/1964 | Gardiner _____ 277—96 X |
| 3,204,969 | 9/1965 | Williams _____ 277—96 X |
| 3,231,284 | 1/1966 | Peickii et al. _____ 277—38 |
| 3,262,635 | 7/1966 | Smuland _____ 253—77.3 X |

SAMUEL ROTHBERG, *Primary Examiner*.